United States Patent
Zhu et al.

(10) Patent No.: US 12,058,960 B2
(45) Date of Patent: Aug. 13, 2024

(54) WALK-BEHIND SELF-PROPELLED MACHINE

(71) Applicant: Nanjing Chervon Industry Co., Ltd., Nanjing (CN)

(72) Inventors: Ronggen Zhu, Nanjing (CN); Liang Chen, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 690 days.

(21) Appl. No.: 17/235,429

(22) Filed: Apr. 20, 2021

(65) Prior Publication Data
US 2022/0071096 A1 Mar. 10, 2022

Related U.S. Application Data

(63) Continuation of application No. PCT/CN2019/119703, filed on Nov. 20, 2019.

(30) Foreign Application Priority Data

Nov. 20, 2018 (CN) .......................... 201811385342.4

(51) Int. Cl.
*A01D 69/08* (2006.01)
*A01D 34/00* (2006.01)
(Continued)

(52) U.S. Cl.
CPC ............. *A01D 69/08* (2013.01); *A01D 34/00* (2013.01); *A01D 42/08* (2013.01); *A01D 2101/00* (2013.01)

(58) Field of Classification Search
CPC ........ A01D 69/08; A01D 34/00; A01D 42/08; A01D 2101/00
See application file for complete search history.

(56) References Cited

U.S. PATENT DOCUMENTS 4,212,141 A * 7/1980 Miyazawa .............. F16D 67/02
56/DIG. 18
4,538,401 A 9/1985 Takamizawa et al.
(Continued)

FOREIGN PATENT DOCUMENTS

CA 2383671 A1 10/2002
CN 1318134 A 10/2001
(Continued)

OTHER PUBLICATIONS

ISA/CN, Int. Search Report issued on PCT application No. PCT/CN2019/119703, dated Feb. 25, 2020, 3 pages.
(Continued)

*Primary Examiner* — Kevin Hurley
*Assistant Examiner* — Michael R Stabley
(74) *Attorney, Agent, or Firm* — Greenberg Traurig, LLP

(57) ABSTRACT

A walk-behind self-propelled machine includes: a body, wheels, a handle connected to the body, a motor, a driver coupled to the motor and driven by the motor, and a follower coupled to the wheels and enabled to drive the wheels to rotate, and a clutch. The clutch allows the driver to transmit power to the follower when the clutch is in a first position, the clutch cuts off a power transmission path between the motor and the wheels when the clutch is in a second position, the clutch is rotatably mounted to the driver, the clutch is in contact with the follower when the clutch rotates to the first position, and the clutch is disengaged from the follower when the clutch rotates to the second position.

21 Claims, 11 Drawing Sheets

(51) Int. Cl.
*A01D 42/08* (2006.01)
*A01D 101/00* (2006.01)

(56) References Cited

U.S. PATENT DOCUMENTS

| | | | | |
|---|---|---|---|---|
| 4,909,365 A * | 3/1990 | Tillotson | ................ | F16D 41/12 |
| | | | | 192/39 |
| 6,230,678 B1 * | 5/2001 | Gracyalny | ............ | F02N 15/027 |
| | | | | 123/185.14 |
| 6,311,663 B2 | 11/2001 | Gracyalny et al. | | |
| 6,354,414 B1 * | 3/2002 | Sueshige | .............. | B60K 7/0007 |
| | | | | 192/45.005 |
| 6,386,169 B1 * | 5/2002 | Gracyalny | ............ | F02N 15/027 |
| | | | | 123/185.14 |
| 6,615,787 B2 | 9/2003 | Gracyalny | | |
| 9,797,360 B2 * | 10/2017 | Ke | ........................ | F02N 15/006 |
| 10,271,476 B2 * | 4/2019 | Yoshimura | .......... | A01D 34/6812 |
| 2017/0265386 A1 | 9/2017 | Yoshimura et al. | | |

FOREIGN PATENT DOCUMENTS

| | | |
|---|---|---|
| CN | 2743610 Y | 11/2005 |
| CN | 101077050 A | 11/2007 |
| CN | 103166536 A | 6/2013 |
| CN | 103202136 A | 7/2013 |
| CN | 106090068 A | 11/2016 |
| CN | 207022562 U | 2/2018 |
| CN | 207539214 U | 6/2018 |
| CN | 108235856 A | 7/2018 |
| EP | 2740344 A2 | 6/2014 |
| JP | 2017163917 A | 9/2017 |

OTHER PUBLICATIONS

EPO, extended European Search Report issued on European publication No. 3854194, dated Nov. 2, 2021, 10 pages.
EPO, examination report issued on European patent application No. 19887244.2, dated Mar. 7, 2023, 6 pages.
CIPO, Office Action issued on Canadian patent application No. 3,120,730, dated Sep. 12, 2022, 7 pages.

* cited by examiner

WALK-BEHIND SELF-PROPELLED MACHINE

RELATED APPLICATION INFORMATION

The present application is a continuation of International Application Number PCT/CN2019/119703, filed on Nov. 20, 2019, through which this application also claims the benefit under 35 U.S.C. § 119(a) of Chinese Patent Application No. 201811385342.4, filed on Nov. 20, 2018, which applications are incorporated herein by reference in their entirety herein.

BACKGROUND

Lawn mowers, snow blowers, etc. are common walk-behind self-propelled machines. A walk-behind self-propelled machine may include a motor, wheels and a transmission device. Through the transmission device, the motor drives the wheels to rotate, so that the walk-behind self-propelled machine moves relative to the ground. Generally speaking, in order to meet the steering needs of the machine, the machine is provided with a clutch. In related art, when the motor shaft of the walk-behind self-propelled machine with a clutch stops rotating, a user manually pushes the machine so that the clutch shuts off the transmission between the wheels and the motor shaft, which causes inconvenient operation. Few machines with "automatic" clutches that do not require manual operation by the user are prone to problems such as "deadlock", "stuck" or excessively complicated clutch structure due to unreasonable structural design.

SUMMARY

An example provides a walk-behind self-propelled machine. The walk-behind self-propelled machine includes: a body; a plurality of wheels for supporting the body and driving the body to walk; a handle connected to the body; a motor for driving the wheels to rotate; a driver coupled to the motor and driven by the motor; a follower coupled to the plurality of wheels and enabled to drive the plurality of wheels to rotate; and a clutch switchable between a first position and a second position; when the clutch is in the first position, the clutch allows the driver to transmit power to the follower; when the clutch is in the second position, the clutch cuts off a power transmission path between the motor and the plurality of wheels; wherein the clutch is rotatably mounted to the driver; when the clutch rotates to the first position, the clutch is in contact with the follower; when the clutch rotates to the second position, the clutch is disengaged from the follower.

In an example, the clutch includes a connecting portion, a moving portion and a driving portion; the connecting portion is rotatably mounted to the driver; the moving portion and the driving portion are respectively connected to the connecting portion or integrally formed with the connecting portion.

In an example, the motor has a motor shaft; the moving portion has a disconnected position and a driving position with respect to the follower; the driving portion drives the moving portion to switch between the disconnected position and the driving position; when the moving portion is in the driving position, the motor shaft drives the wheels to rotate; when the moving portion is in the disconnected position, the wheels rotate freely with respect to the motor shaft.

In an example, the driver is provided with a stopper for limiting a movement range of the moving portion.

In an example, the walk-behind self-propelled machine further includes a housing for accommodating the driver and the follower; when the clutch is rotatably mounted to the driver, the connecting portion is mounted to the driver, the driving portion is in contact with a surface of the housing and generates a positive pressure perpendicular to the surface of contact, and the moving portion is enabled to contact or detach from the follower.

In an example, the housing is formed with a contact surface, the driving portion has a convex surface protruding outward, and the convex surface forms a pressing contact with the contact surface.

In an example, the driver is a gear; the follower is a ratchet wheel; the driving portion and the moving portion are respectively arranged on both sides of the driver along a thickness direction of the driver.

In an example, when the motor rotates in a first direction, the clutch is switched from the second position to the first position; when the motor rotates in a second direction opposite to the first direction, the clutch is switched from the first position to the second position.

In an example, when the motor rotates in the first direction, a moving portion moves from a disconnected position to a driving position with respect to the driver; when the motor rotates in the second direction, the moving portion moves from the driving position to the disconnected position with respect to the driver.

In an example, the walk-behind self-propelled machine further includes a magnetic member for forming a magnetic contact with the driving portion.

In an example, the walk-behind self-propelled machine further includes: a control device for controlling an operation of the motor; the control device includes: an operating switch operable by a user, connected or communicatively connected with the motor; a start module configured to send a first signal and a second signal, wherein the first signal controls the motor to rotate in a first direction, and the second signal controls the motor to stop rotating.

In an example, the control device further includes: a control module communicationally or electrically connected with the operating switch, wherein when the start module sends the second signal, the control module controls the motor to rotate in a second direction for a predetermined time period, which ranges from 2 seconds to 20 seconds.

An example provides a walk-behind self-propelled machine. The walk-behind self-propelled machine includes: a body; a plurality of wheels for supporting the body and driving the body to walk; a handle connected to the body; a motor for driving the wheels to rotate; a driver coupled to the motor and driven by the motor; a follower coupled to the plurality of wheels and enabled to drive the plurality of wheels to rotate; and a clutch switchable between a first position and a second position; when the clutch is in the first position, the clutch allows the driver to transmit power to the follower; when the clutch is in the second position, the clutch cuts off a power transmission path between the motor and the plurality of wheels; wherein the clutch is rotatably mounted to the follower; when the clutch rotates to the first position, the clutch is in contact with the driver; when the clutch rotates to the second position, the clutch is disengaged from the driver.

In an example, the clutch includes a connecting portion, a moving portion and a driving portion; the connecting portion is rotatably mounted to the driver; the moving portion and the driving portion are respectively connected to the connecting portion or integrally formed with the connecting portion.

In an example, the motor has a motor shaft; the moving portion has a disconnected position and a driving position with respect to the follower; the driving portion drives the moving portion to switch between the disconnected position and the driving position; when the moving portion is in the driving position, the motor shaft drives the wheels to rotate; when the moving portion is in the disconnected position, the wheels rotate freely with respect to the motor shaft.

In an example, the walk-behind self-propelled machine further includes a housing for accommodating the driver and the follower; when the clutch is rotatably mounted to the driver, the connecting portion is mounted to the driver, the driving portion is in contact with a surface of the housing and generates a positive pressure perpendicular to the surface of contact, and the moving portion is enabled to contact or detach from the follower.

In an example, the driver is a ratchet wheel; the follower is a gear; the driving portion and the moving portion are arranged on a same side of the follower along a thickness direction of the follower.

In an example, the housing is formed with a contact surface, the driving portion has a convex surface protruding outward, and the convex surface forms a pressing contact with the contact surface.

In an example, when the clutch is rotatably mounted to the follower, the connecting portion is mounted to the follower, the driving portion is in contact with a surface of the driver and generates a positive pressure perpendicular to the surface of contact, and the moving portion is enabled to contact or detach from the driver.

In an example, when the motor rotates in a first direction, the clutch is switched from the second position to the first position; when the motor rotates in a second direction opposite to the first direction, the clutch is switched from the first position to the second position.

In an example, when the motor rotates in the first direction, the moving portion moves from the disconnected position to the driving position with respect to the driver; when the motor rotates in the second direction, the moving portion moves from the driving position to the disconnected position with respect to the driver.

In an example, the walk-behind self-propelled machine further includes a magnetic member for forming a magnetic contact with the driving portion.

In an example, the walk-behind self-propelled machine further includes: a control device for controlling an operation of the motor; the control device includes: an operating switch operable by a user, connected or communicatively connected with the motor; a start module configured to send a first signal and a second signal, wherein the first signal controls the motor to rotate in a first direction, and the second signal controls the motor to stop rotating.

In an example, the control device further includes: a control module communicationally or electrically connected with the operating switch, wherein when the start module sends the second signal, the control module controls the motor to rotate in a second direction for a predetermined time period, which ranges from 2 seconds to 20 seconds.

The walk-behind self-propelled machine of the present application has a simpler yet more effective clutch, thereby making it more convenient and smooth for the user to practically operate the walk-behind self-propelled machine.

DETAILED DESCRIPTION

Figure 1:
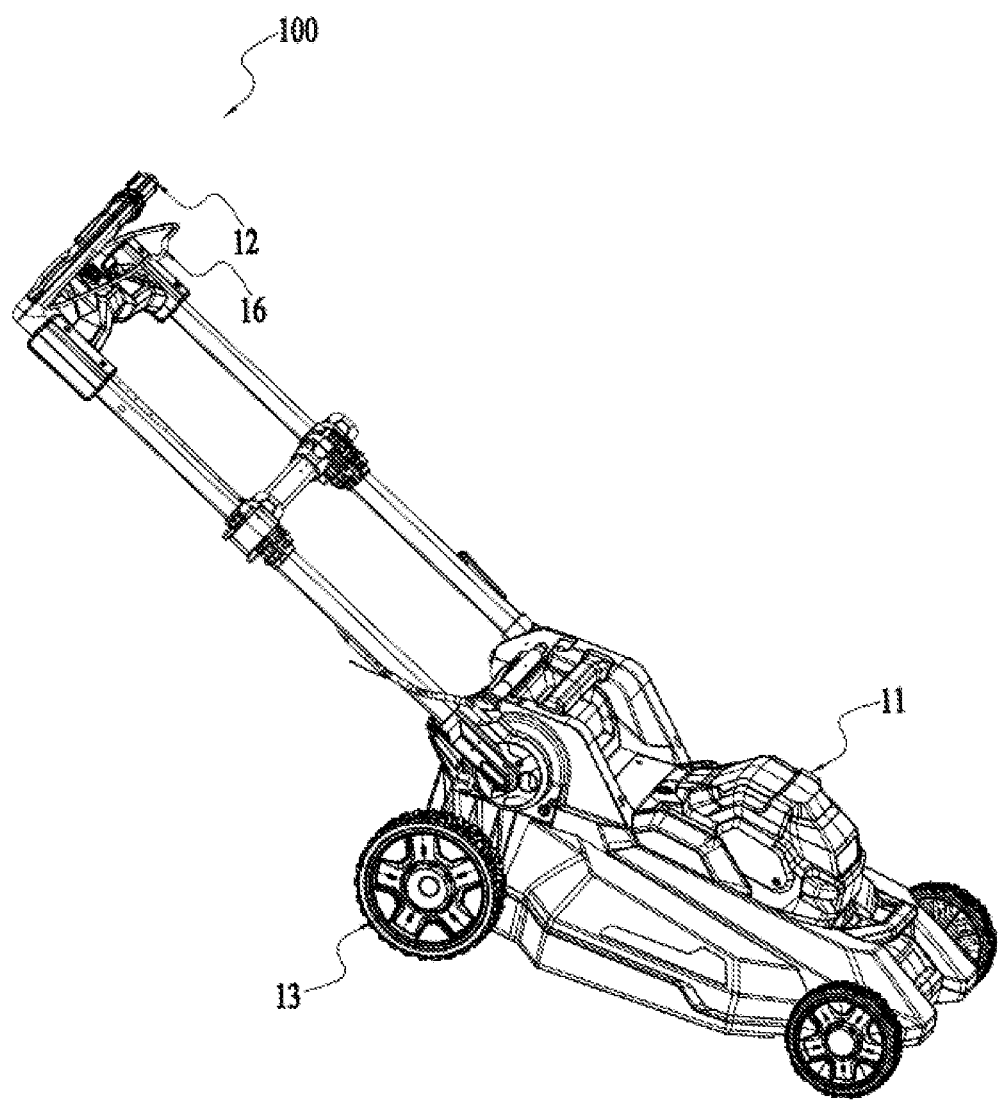
FIG. 1 is a schematic diagram of a walk-behind lawn mower according to a first example of the present application.

The walk-behind self-propelled machine shown in FIG. 1 may be an electric machine that works indoors or outdoors. In this example, as an example, the walk-behind self-propelled machine may be a walk-behind lawn mower 100. The walk-behind lawn mower 100 can be pushed and operated by a user to trim lawn, vegetation, etc.

It can be understood that the walk-behind self-propelled machine may also be other types of tools, such as walk-behind electric tools that output a certain form of power to realize the functions of the tools, for example, a walk-behind snow blower, a walk-behind automatic vacuum, a walk-behind automatic sprinkler, etc. Of course, it can be understood that the walk-behind self-propelled machine may also be tools with other purposes, such as a walk-behind forklift. In fact, as long as the tool includes the subject-matter of the following description, they fall within the protection scope of the present disclosure.

As shown in FIGS. 1-4, the walk-behind lawn mower 100 includes: a body 11, a handle 12, wheels 13, a motor 14 and a transmission device 15. The body 11 is configured to install the motor 14; the wheels 13 are configured to support the body 11 and drive the body 11 to walk, i.e., to move across the ground. The wheels 13 contact the ground. The wheels 13 can rotate relative to the body 11 about a first axis 101 or an axis parallel to the first axis 101, so that the walk-behind lawn mower 100 moves relative to the ground; the handle 12 can be pushed or operated by a user in order to control the walk-behind lawn mower 100; the handle 12 is connected to the body 11, the user can push the handle 12 to make the body 11 and the wheels 13 move with respect to the ground, so that the walk-behind lawn mower 100 moves with respect to the ground. The motor 14 includes a motor shaft 141 for driving the wheels 13 to rotate. The axis of rotation of the motor shaft 141 is the first axis 101.

In one example, the motor 14 is an electrical machine. The motor 14 can also be referred to as a self-propelled motor. The walk-behind lawn mower 100 also includes a battery pack that supplies power to the motor 14. In an alternative example, the motor 14 may also be an internal combustion engine powered by fuel combustion.

The transmission device 15 transmits power between the motor 14 and the wheels 13. The transmission device 15 connects the motor shaft 141 and the wheels 13 and realizes power transmission between the motor shaft 141 and the wheels 13. In some examples, the transmission device 15 realizes unidirectional power transmission between the motor shaft 141 and the wheels 13. The transmission device 15 drives the wheels 13 to rotate when the motor shaft 141 actively rotates. When the wheels 13 are not driven by the transmission device 15, the wheels 13 can rotate freely with respect to the motor shaft 141. The transmission device 15 includes a clutch 151 through which the transmission device 15 transmits or does not transmit power from the motor shaft 141. In some examples, the clutch 151 has a first position and a second position; the clutch 151 can be switched between the second position and the first position. When the motor 14 rotates about the first axis 101 along a first direction 11', the clutch 151 is switched to the first position, and the motor shaft 141 drives the wheels 13 to rotate; when the motor 14 rotates about the first axis 101 along a second direction opposite to the first direction 11', the clutch 151 is switched to the second position, and the wheels 13 can rotate freely with respect to the motor shaft 141.

The walk-behind lawn mower 100 is also provided with a control device 16 for controlling the operation of the motor 14, including controlling the start and stop of the motor 14 and adjusting the rotational speed of the motor 14. In some examples, the control device 16 includes an operating switch that is electrically or communicatively connected to the motor 14 for enabling the motor 14 to start or stop rotating. The control device 16 further includes a speed regulating switch for user operation to adjust the rotational speed of the motor 14; in an alternative example, the operating switch and the speed regulating switch are integrated into one operating piece. Optionally, the control device 16 further includes a signal transceiving device for receiving signals from the operating switch and transmitting signals to the motor 14, and the motor 14 responds to the signals accordingly. The control device 16 also includes a start module, which can send a first signal that controls the motor 14 to rotate forward and a second signal that controls the motor 14 to stop rotating; the control device 16 also includes a control module, which controls the motor 14 to rotate reversely for a predetermined time period when the start module sends the second signal. The predetermined time period ranges from 2 seconds to 20 seconds, optionally 5 seconds. In some examples, the control module and the operating switch are communicatively or electrically connected. When the operating switch is actuated, the operating switch sends a signal to the control module, which controls the motor 14 in response.

In this example, the state of the clutch 151 is switched with the following control method: when the user actuates the operating switch, the operating switch sends a signal to the electronic control element. After receiving the signal, the electric control element controls the motor 14 to rotate forwardly, that is, rotate about the first axis 101 in the first direction 11'. When the user releases the operating switch, the operating switch sends a signal to the electronic control element, and the electronic control element controls the motor 14 to rotate reversely, that is, rotate about the first axis 101 in the second direction. In this way the clutch 151 can be switched between the first position and the second position. That is, with this control method, as long as the user releases the operating switch, the wheels 13 can freely rotate with respect to the motor shaft 141, at this time, the user can manually push the machine forward or backward without triggering the operating switch. In an alternative example, the operating switch has two gear positions that respectively control the forward and reverse rotation of the motor 14; in another alternative example, the control device 16 further includes a second switch, independent of the operating switch, for controlling the reverse rotation of the motor. The operating switch and the second switch may be mechanical switches in the form of a trigger, a toggle, etc., or signal switches.

The transmission device 15 includes a driver 152 and a follower 153. The driver 152 is directly or indirectly connected to and driven by the motor shaft 141. The follower 153 is directly or indirectly connected to the wheels 13 and drives the wheels 13. The driver 152 drives the follower 153 to rotate. In some examples, the transmission device 15 is a gear transmission; in some examples, the driver 152 is a spur gear, and the follower 153 is a ratchet wheel. The clutch 151 is configured to realize power transmission between the driver 152 and the follower 153. When the clutch 151 is in the first position, the clutch 151 allows the driver 152 to transmit power to the follower 153; and when the clutch 151 is in the second position, the clutch 151 cuts off the power transmission path between the motor 14 and the wheels 13. In some examples, when the clutch 151 is in the first position, the clutch 151 connects the driver 152 and the follower 153; when the clutch 151 is in the second position, the clutch 151 does not connect the driver 152 and the follower 153. In some examples, when the clutch 151 is in the second position, the clutch 151 is not connected with the driver 152 or the follower 153. In this example, the clutch 151 is rotatably mounted to the driver 152. When the clutch 151 is in the first position, the clutch 151 contacts the follower 153 at the same time. When the clutch 151 is in the second position, the clutch 151 is disengaged from the follower 153.

As shown in FIGS. 5-8, in some examples, the clutch 151 includes a connecting portion 151a and a moving portion 151b. The moving portion 151b is connected to the connecting portion 151a, and the connecting portion 151a is connected to the driver 152. When the clutch 151 is switching between the first position and the second position, the motor 14 drives the driver 152 to rotate, and the connecting portion 151a rotate synchronously with the driver 152; the moving portion 151b moves relative to the driver 152. In some examples, the moving portion 151*b* has a disconnected position and a driving position, respectively corresponding to the first position and the second position of the clutch 151. The moving portion 151*b* switches between the disconnected position and the driving position so that the clutch 151 can switch between the second position and the first position. In some examples, when the motor 14 rotates in the first direction 11', the clutch 151 is switched from the second position to the first position, and the moving portion 151*b* moves from the disconnected position to the driving position relative to the driver 152; when the motor 14 rotates in the second direction, the clutch 151 is switched from the first position to the second position, and the moving portion 151*b* moves from the driving position to the disconnected position relative to the driver 152. When the moving portion 151*b* is in the driving position, the motor shaft 141 can drive the wheels 13 to rotate, and when the moving portion 151*b* is in the disconnected position, the wheels 13 can freely rotate relative to the motor shaft 141.

The motor 14 may directly drive the driver 152 to rotate through the motor shaft 141 or may drive the driver 152 through other transmission structures. In one example, the connecting portion 151*a* and the driver 152 form a movable connection, and the moving portion 151*b* and the connecting portion 151*a* are integrally formed or fixedly connected. In another example, the connecting portion 151*a* and the driver 152 form a fixed connection, and the moving portion 151*b* and the connecting portion 151*a* form a movable connection. In this example, the connecting portion 151*a* and the driver 152 form a rotatable connection, and the moving portion 151*b* and the connecting portion 151*a* are integrally formed or fixedly connected.

The clutch 151 further includes a driving portion 151*c*. When the clutch 151 is switching between the first position and the second position, the driving portion 151*c* drives the moving portion 151*b* to move relative to the driver 152. That is, when the clutch 151 is switching between the first position and the second position, the motor 14 rotates in the first direction 11' to drive the driver 152 to rotate, and the driver 152 rotates to drive the driving portion 151*c* to move, thereby the driving portion 151*c* drives the moving portion 151*b* to move relative to the driver 152, so that the moving portion 151*b* is switched between the driving position and the disconnected position. In some examples, the driving portion 151*c* and the moving portion 151*b* form a linkage; when the driver 152 rotates in the first direction 11', the driving portion 151*c* spontaneously moves to a position corresponding to the driving position of the moving portion 151*b*; when the driver 152 rotates in the second direction, the driving portion 151*c* spontaneously moves to a position corresponding to the disconnected position of the moving portion 151*b*. It should be noted that, if the moving portion 151*b* itself is in the driving position and the driver 152 rotates in the first direction 11', the driving portion 151*c* does not move; if the moving portion 151*b* itself is in the disconnected position and the driver 152 rotates in the second direction, the driving portion 151*c* does not move, either.

The transmission device 15 further includes a housing 154 for accommodating the driver 152 and the follower 153, and the housing 154 is mounted to one side of the wheels 13 in the axial direction. The housing 154, the driver 152 and the follower 153 are located on the same side of the wheels 13 in the axial direction. The housing 154 includes a contact surface 154*a* that contacts the driving portion 151*c*. In this example, the contact surface 154*a* is an end surface of the housing 154, and the end surface extends in a plane perpendicular to the axial direction.

In this example, the theory of motion of the clutch 151 switching between the first position and the second position is as follows: when the motor shaft 141 rotates in the first direction 11', the driver 152 is driven by the motor shaft 141, because the connecting portion 151*a* is connected to the driver 152 and rotates synchronously with the driver 152, and the driving portion 151*c* moves relative to the driver 152 under a resultant force of a tensile force of the connecting portion 151*a* and a friction force of the contact surface 154*a*, thereby driving the moving portion 151*b* to move relative to the driver 152. The direction of the friction force of the contact surface 154*a* and the tensile force of the connecting portion 151*a* acting on the rotating driving portion 151*c* change continuously, resulting in continuous change of the force received by the driving portion 151*c*. Without other obstructions, the driving portion 151*c* will move to an equilibrium position where the force received is balanced. Before the driving portion 151*c* moves to the equilibrium position, driven by the driving portion 151*c*, the moving portion 151*b* moves to the driving position, and stops moving under a resistance force of the follower 153; and the driving portion 151*c* also stops moving under a resistance force of the moving portion 151*b*. Conversely, when the motor shaft 141 rotates in the second direction, the driving portion 151*c* moves relative to the driver 152 under a resultant force of a tensile force of the connecting portion 151*a* and a friction force of the contact surface 154*a*, thereby driving the moving portion 151*b* to perform relative motion, disconnect the moving portion 153, and move to the disconnected position. It should be noted that any position where the moving portion 151*b* does not connect or contact with the follower 153 is a disconnected position.

Figure 9:
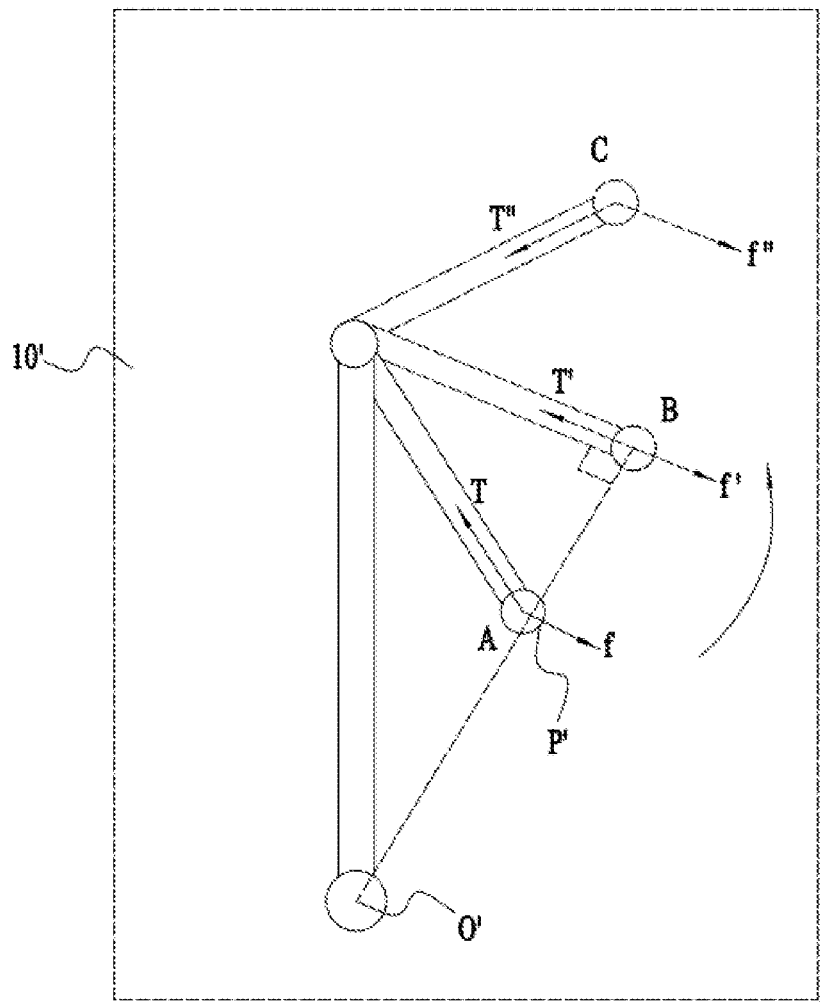
FIG. 9 is a schematic diagram of a working principle model of a clutch of the walk-behind lawn mower according to the first example of the present application.
Figure 10:
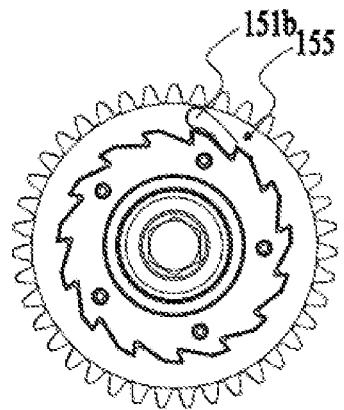
FIG. 10 is a front view of the transmission device in FIG. 4, wherein a moving portion is in a driving position.
Figure 11:
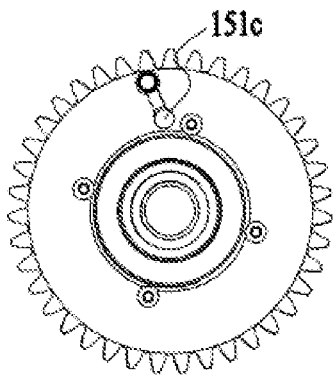
FIG. 11 is a rear view of the transmission device in FIG. 4, wherein the moving portion is in the driving position.
Figure 12:
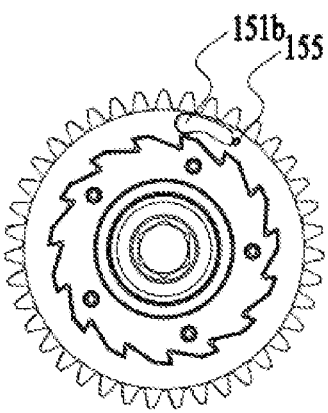
FIG. 12 is a front view of the transmission device in FIG. 4, wherein the moving portion is in a disconnected position.
Figure 13:
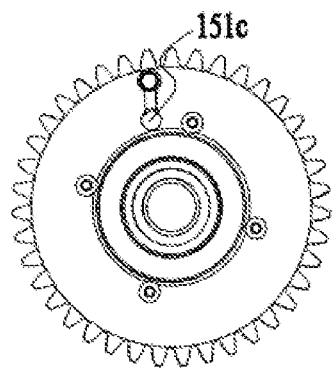
FIG. 13 is a rear view of the transmission device in FIG. 4, wherein the moving portion in the disconnected position.
Figure 14:
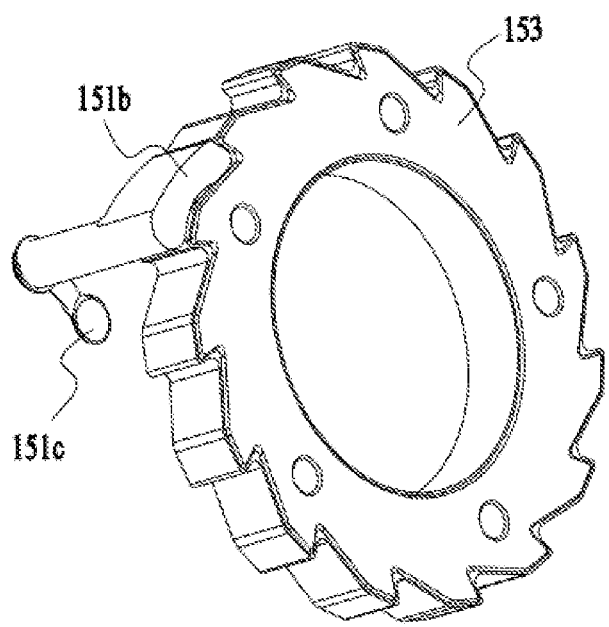
FIG. 14 is a perspective view of a partial structure of the transmission device in FIG. 4.
Figure 15:
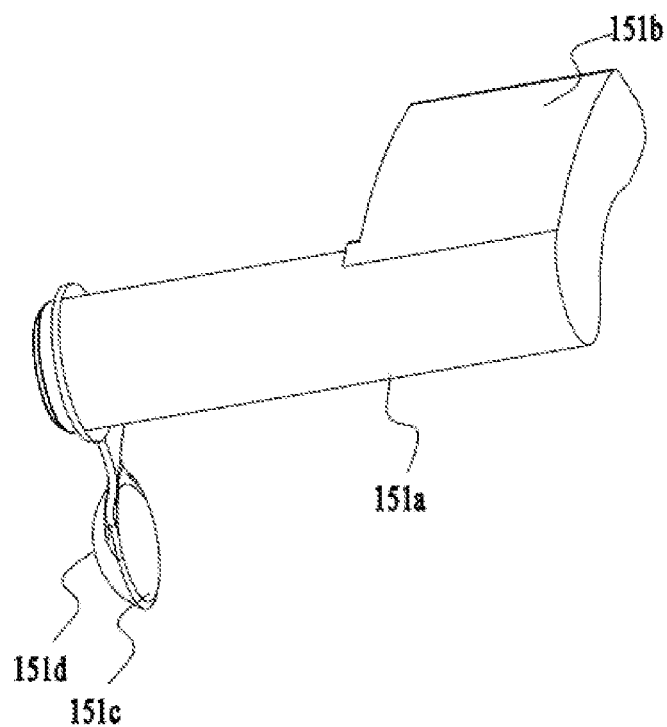
FIG. 15 is a perspective view of the structure of the clutch of the transmission device in FIG. 4.

In order to explain the theory of motion of the driving portion 151*c* and the moving portion 151*b* moving relative to the driver 152, the following theoretical model is constructed:

As shown in FIG. 9, there is a linkage mechanism in the vertical plane 10' denoted by the dotted rectangular frame. The linkage mechanism includes a long link and a short link. The long link and the short link form a rotatable connection. A ball P' is fixed at one end of the short link, on the vertical plane 10'. When the long link rotates counterclockwise in the plane 10' about a pivot O', assuming that gravity and centrifugal force are ignored: the ball P' receives a tensile force T of the short link and a friction force f of plane 10' at point A. Under the resultant force of the two, the ball P' moves relative to the long link, in the direction shown by the arrow in FIG. 9, to the relative equilibrium position B, at which time the ball P' receives a static friction force f' and a tensile force T' of the short link in opposite direction and equal magnitude, and thus stops moving relative to the long link. At this time, the short link is located on a tangent line of a circumference where the ball P' is located and centered at point O'. Conversely, when the long link rotates counterclockwise in the plane 10' about the pivot O', the ball P' moves relative to the long link from the point C to the relative equilibrium position B.

According to the above theoretical model, it can be understood that, in this example, the clutch 151 is equivalent to the whole formed by the ball P' and the short link, and the driver 152 is equivalent to the long link. The friction between the driving portion 151*c* and the housing 154 is equivalent to the friction between the ball P' and the vertical plane 10'.

As shown in FIGS. 10-15, the transmission device 15 further includes a stopper 155. The stopper 155 is provided at a certain disconnected position on the movement trajectory of the moving portion 151 *b*, that is, any position not connecting or contacting with the follower 153. The stopper 155 is configured to prevent the moving portion 151*b* from continuing to move relative to the driver 152 before the driving portion 151*c* moves to the equilibrium position, so that the driving portion 151*c* also stops moving relative to the driver 152. Due to the size limitation of the driver 152, in this example, a stopper 155 is provided to limit the movement range of the moving portion 151*b*, so as to avoid interference between the moving portion 151*b* and other components. That is, due to the limit of the follower 153 and the stopper 155, the moving portion 151*b* is restricted to move between the driving position and the disconnected position corresponding to the position of the stopper 155, thereby restricting the driving portion 151*c* to move between positions corresponding to these two positions. In this example, when the moving portion 151*b* is engaged with the follower 153, the position of the moving portion 151*b* is the driving position of the moving portion 151*b*, corresponding to the first position of the clutch 151; when the moving portion 151*b* is disengaged from the follower 153, the position of the moving portion 151*b* is the disconnected position of the moving portion 151*b*. The moving portion 151*b* has a plurality of disconnected positions, which corresponds to a plurality of second positions of the clutch 151. The moving portion 151*b* is in a disconnected position as long as it does not mesh with the follower 153. When the moving portion 151*b* moves to a position where it interacts with the stopper 155, the corresponding position is the farthest disconnected position that the moving portion 151*b* can reach with respect to the driver 152. In some examples, the stopper 155 is a limit pin provided on the surface of the driver 152. Of course, the stopper 155 may also be other limit structures. FIGS. 10-13 are schematic diagrams of the moving portion 151*b* and the driving portion 151*c* at two extreme positions, wherein, in FIGS. 10-11, the moving portion 151*b* is in the driving position, and the driving portion 151*c* in a position corresponding to the driving position of the moving portion 151*b*; in FIGS. 12-13, the moving portion 151*b* is in the disconnected position and is in contact with the stopper 155, and the driving portion 151*c* is in a position corresponding to the disconnected position of the moving portion 151*b*.

The clutch 151 may be made of metal materials, may be integrally formed or assembled from multiple parts. The driver 152 is a gear. The driving portion 151*c* and the moving portion 151*b* are respectively mounted on both sides of the driver 152 along the thickness direction of the driver 152. The driving portion 151*c* is always in contact with the surface of the driver 152. The connecting portion 151*a* is a connecting shaft, which passes through the driver 152 in the thickness direction of the driver 152 and forms a rotatable connection with the driver 152; the axial length of the connecting shaft is substantially equal to the thickness of the gear. The moving portion 151*b* and the driving portion 151*c* are fixedly connected to both ends of the connecting portion 151*a* or integrally formed with the connecting portion 151*a*, and the three constitute a synchronous movement.

The driving portion 151*c* is a metal flat spring; specifically, the driving portion 151*c* may be a scoop-shaped metal flat spring. The scoop-shaped metal flat spring has a convex surface 151*d* protruding outwardly. The convex surface 151*d* and the contact surface 154*a* of the housing 154 form a pressing contact, which causes a pressure perpendicular to the contact surface 154*a* and thereby generates a friction force. During the movement of the driving portion 151*c* relative to the driver 152, sliding friction occurs between the convex surface 151*d* and the contact surface 154*a* of the housing 154. In an alternative example, the driving portion 151*c* includes a magnetic member that forms a magnetic connection with the housing 154, and magnetic attraction force causes a pressure perpendicular to the contact surface 154*a* and thereby generates a friction force. Meanwhile, the housing 154 may be made of a magnetic material, or a magnetic member may be installed on the contact surface 154*a*. It should be understood that, the structure in which the driving portion 151*c* contacts with the housing 154 is sufficient as long as relative sliding between driving portion 151*c* and the housing 154 can be achieved.

The moving portion 151*b* may be a metal pawl, and the follower 153 may be a ratchet wheel. When the moving portion 151*b* is in the driving position, the pawl engages with the ratchet wheel, the ratchet wheel is connected to the wheels 13, and during the process the motor 14 drives the wheels 13 to rotate, the motor shaft 141 drives the driver 152 to rotate, the pawl drives the ratchet wheel to rotate, and the ratchet wheel drives the wheels 13 to rotate, thereby realizing the operation of the entire transmission device 15. Both the moving portion 151*b* and the driving portion 151*c* extend in a direction perpendicular to the axis of the connecting portion 151*a*, and the extending directions of the two are substantially perpendicular.

In some examples, the wheels 13 and the ratchet wheel form a coaxial fixed connection. It can be understood that the structure of the moving portion 151*b* and the follower 153 may be other engaging structures besides the ratchet and pawl mechanism, as long as, at the driving position, the moving portion 151*b* can drive the follower 153 to rotate when the motor 14 rotates forward.

Figure 2:
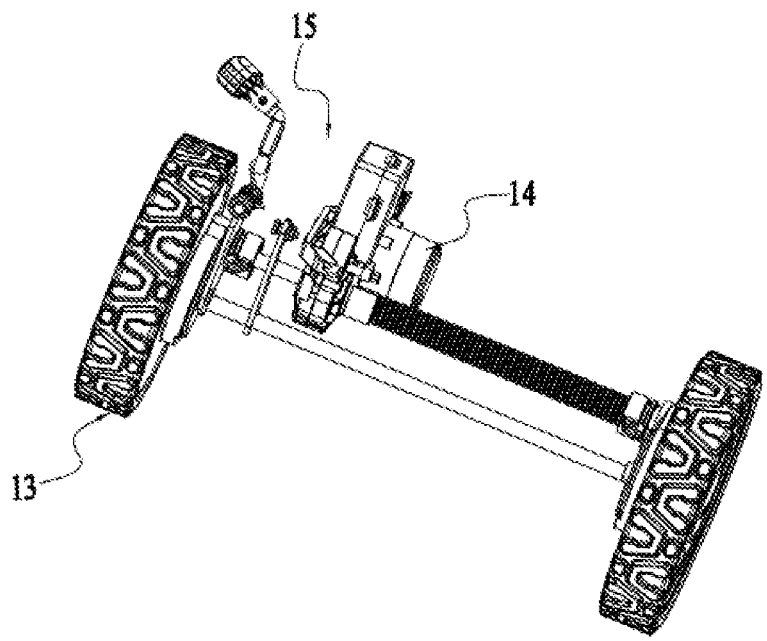
FIG. 2 is a perspective view of a partial structure of the walk-behind lawn mower in FIG. 1.
Figure 3:
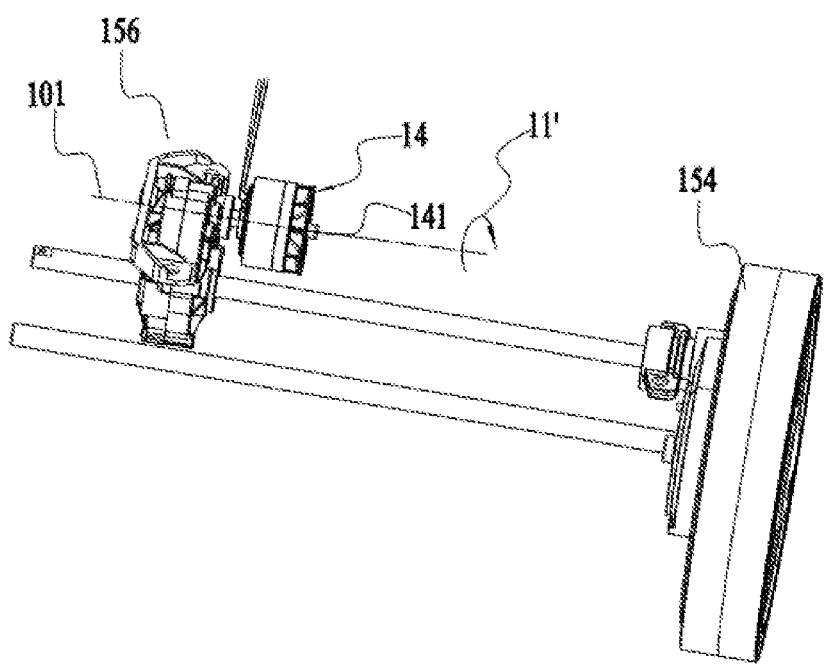
FIG. 3 is a perspective view of a partial structure of the walk-behind lawn mower in FIG. 1.
Figure 4:
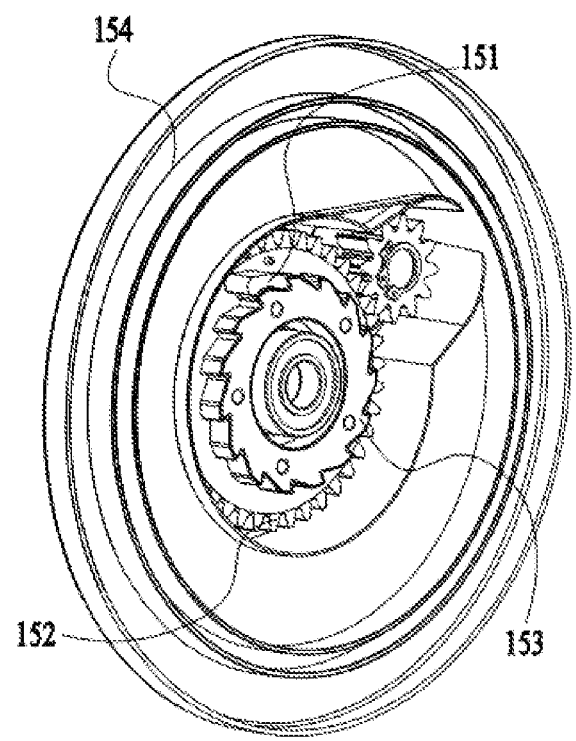
FIG. 4 is a perspective view of a partial structure of a transmission device of the walk-behind lawn mower in FIG. 1.
Figure 5:
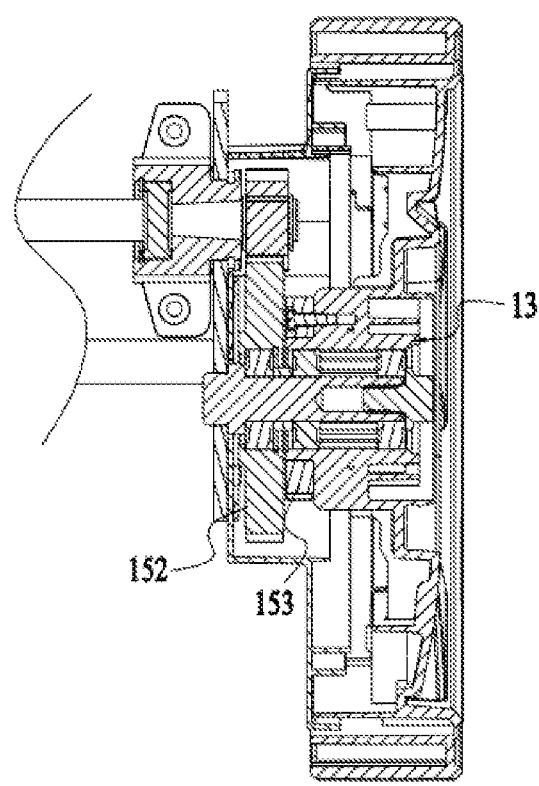
FIG. 5 is a cross-sectional view of a partial structure of the transmission device of the walk-behind lawn mower in FIG. 1.
Figure 6:
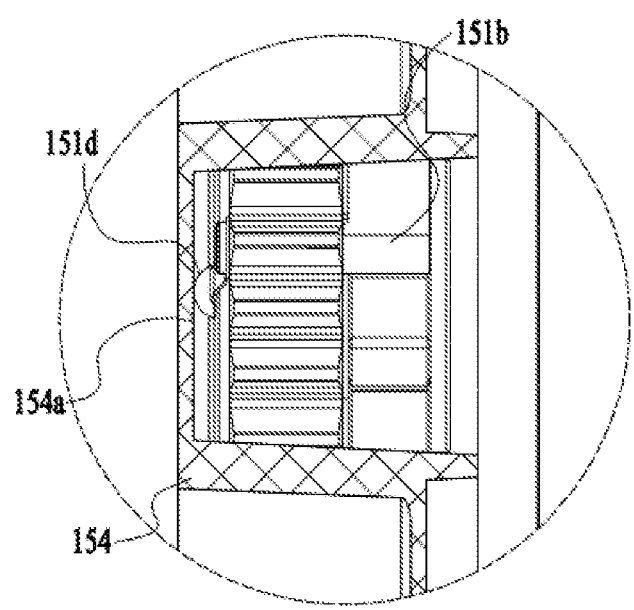
FIG. 6 is a cross-sectional view of a partial structure of the transmission device of the walk-behind lawn mower in FIG. 1.
Figure 7:
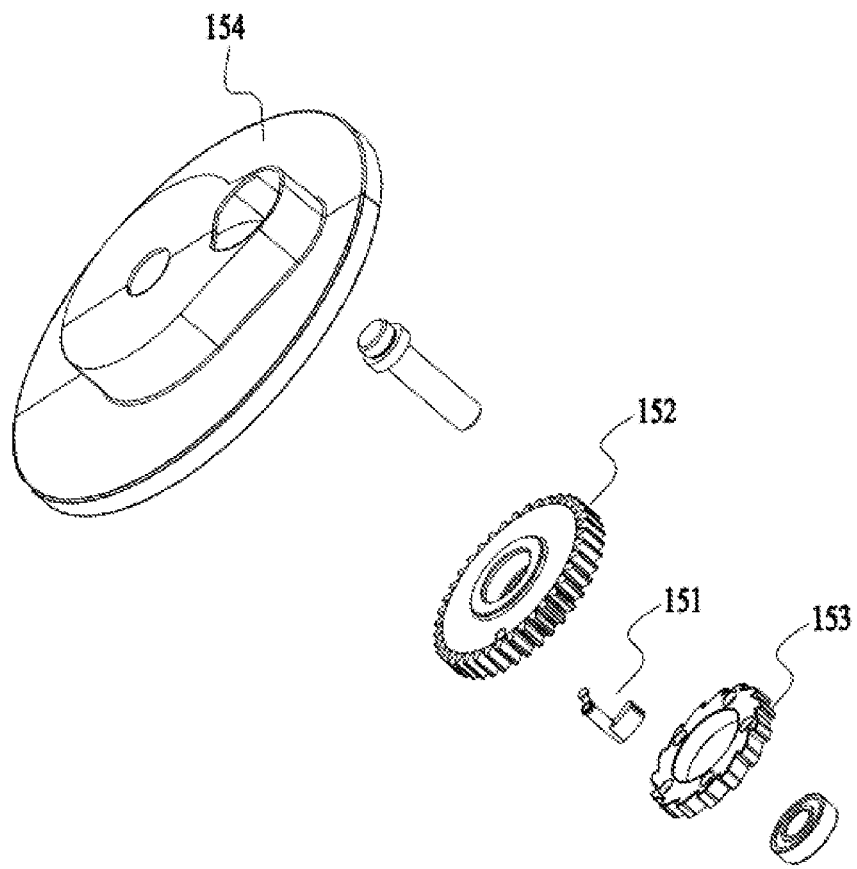
FIG. 7 is an exploded view of a partial structure of the transmission device of the walk-behind lawn mower in FIG. 1.
Figure 8:
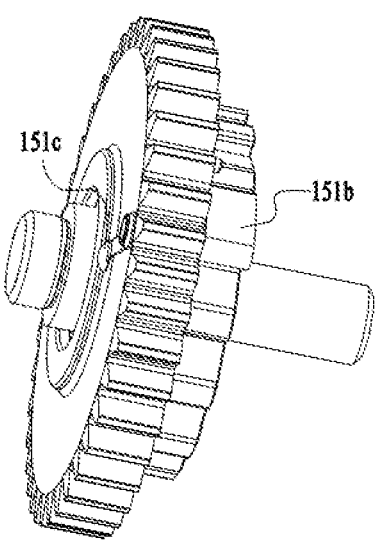
FIG. 8 is a perspective view of a partial structure of the transmission device of the walk-behind lawn mower in FIG. 1.

In addition, as shown in FIGS. 2-4, the transmission device 15 further includes a deceleration device 156, which may be a reduction gearbox. The deceleration device 156 is disposed outside the housing 154 that houses the driver 152 and the follower 153. The motor 14 is decelerated by the deceleration device 156 before transmitting power to the driver 152. In some examples, the deceleration device 156 includes a three-stage deceleration.

Figure 16:
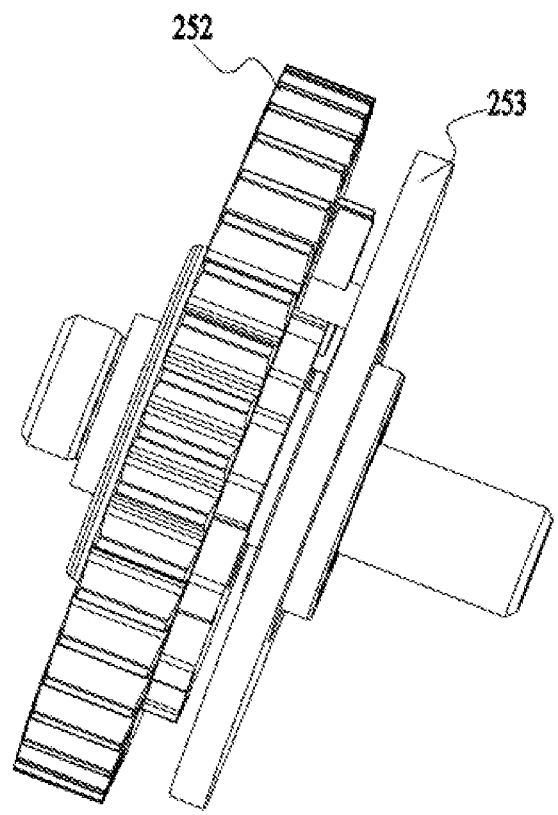
FIG. 16 is a perspective view of a partial structure of a transmission device of a walk-behind lawn mower according to a second example of the present application.
Figure 17:
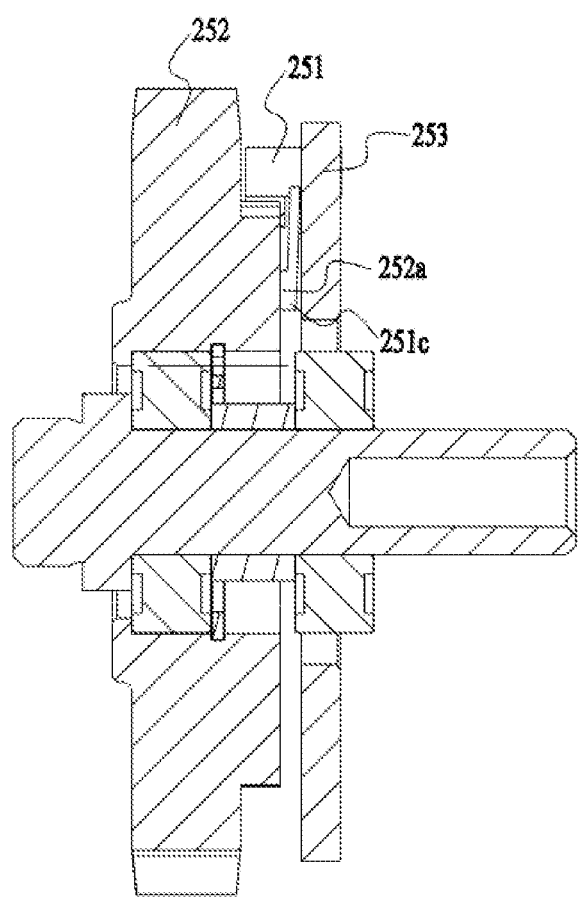
FIG. 17 is a cross-sectional view of the partial structure of the transmission device in FIG. 16.
Figure 18:
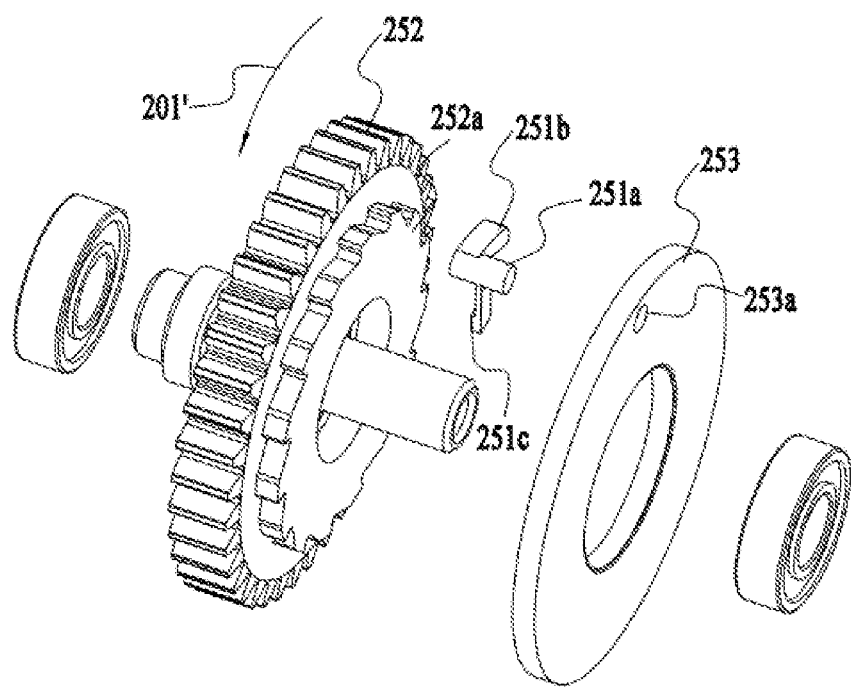
FIG. 18 is an exploded view of the partial structure of the transmission device in FIG. 16.

As shown in FIGS. 16-18, in accordance with the clutch 151 of the walk-behind self-propelled machine 100 in the first example, a clutch 251 of a walk-behind self-propelled machine in a second example of the present application also has a first position and a second position, and the clutch 251 switches between the first position and the second position. When the clutch 251 is in the first position, the clutch 251 allows a driver 252 to transmit power to a follower 253. When the clutch 251 is in the second position, the clutch 251 disconnects the power transmission path between the motor and the wheels. In addition, in this example, the switching of the clutch 251 between the first position and the second position is also realized through the forward and reverse rotation of the motor. The difference is that, in this example, the clutch 251 is rotatably mounted to the follower 253. When the clutch 251 moves to the first position, the clutch 251 contacts the driver 252. When the clutch 251 moves to the second position, the clutch 251 is disengaged from the driver 252. In addition, in this example, the driver 252 is coaxially fixedly connected or integrally formed by a gear and a ratchet wheel. In some examples, the driver 252 is coaxially fixedly connected or integrally formed by a spur gear and a ratchet wheel. In this example, the only requirement for the structure of the follower 253 is to engage with the wheels and to drive the wheels to rotate.

Similarly, the clutch 251 includes a driving portion 251c, a connecting portion 251a and a moving portion 251b. The connecting portion 251a is rotatably mounted to the driver 252 or the follower 253. The moving portion 251b and the driving portion 251c are respectively connected to the connecting portion 251a or integrally formed with the connecting portion 251a. The moving portion 251b has a disconnected position and a driving position, and the driving portion 251c can drive the moving portion 251b to switch between the disconnected position and the driving position. When the moving portion 251b is in the driving position, the motor shaft can drive the wheels to rotate. When the moving portion 251b is in the disconnected position, the wheels can rotate freely with respect to the motor shaft. The structure of the clutch 251 in this example is different from that of the clutch 151 in the first example, and the theory of motion of the driving portion 251c driving the moving portion 251b to move relative to the driver 252 is also different. In this example, the connecting portion 251a of the clutch 251 is rotatably attached to the follower 253, and the driving portion 251c and the moving portion 251b are located on the same side of the follower 253 along its thickness direction. The driving portion 251c is in contact with the surface of the driver 252 close to the driving portion 251c. In some examples, the follower 253 has a connecting hole 253a along its thickness direction, and the connecting portion 251a is coupled to the connecting hole 253a. The driving portion 251c is in contact with the outer surface of the ratchet wheel of the driver 252 and is formed with a positive pressure perpendicular to a contact surface 252a. In this example, the driving portion 251c is a metal flat spring, which forms a pressing contact with the driver 252 to generate a pressure perpendicular to the contact surface 252a and thereby to generate a friction force. In an alternative example, the driving portion 251c may include a magnetic member that can form a magnetic connection with the driver 252, and magnetic attraction force causes a pressure perpendicular to the contact surface 252a and thereby generates a friction force. Meanwhile, the driver 252 can be made of a magnetic material, or a magnetic member can be installed on the contact surface 252a.

It should be noted that the theory of motion of the clutch 251 switching between the first position and the second position in this example is different from the clutch 151 in the first example. Since the clutch 251 in this example is mounted to the follower 253, when the motor drives the driver 252 to rotate, the connecting portion 251a connected to the follower 253 does not rotate with the driver 252, only the driving portion 251c contacting the driver 252 moves relative to the driving member 252 under sliding friction force, thereby driving the moving portion 251b to move relative to the driver 252. In some examples, when the driver 252 is driven by the motor to rotate in the direction 201', the driving portion 251c moves forward under sliding friction force, thereby driving the moving portion 251b to move downward until it engages with the ratchet wheel to achieve meshing drive. Vice versa, when the driver 252 is driven by the motor to rotate in a direction opposite to the direction 201', the driving portion 251c moves backward under sliding friction force, thereby driving the moving portion 251b to move upward to make the clutch disconnected. Of course, the driver 252 may also be provided with a stopper to limit the moving portion 251b. The contents applicable to the present example in the first example can be applied to the present example and will not be described in detail here.

What is claimed is:

1. A walk-behind self-propelled machine, comprising:
   a body;
   a plurality of wheels for supporting the body;
   a handle connected to the body;
   a motor for driving at least one of the plurality of wheels to rotate;
   a driver coupled to the motor and driven by the motor;
   a follower coupled to the at least one of the plurality of wheels and enabled to drive the at least one of the plurality of wheels to rotate; and
   a clutch switchable between a first position and a second position by a friction force, wherein the clutch allows the driver to transmit power to the follower when the clutch is in the first position, the clutch cuts off a power transmission path between the motor and the at least one of the plurality of wheels when the clutch is in the second position, the clutch is rotatably mounted to the driver, the clutch is in contact with the follower when the clutch rotates to the first position, and the clutch is disengaged from the follower when the clutch rotates to the second position.

2. The walk-behind self-propelled machine of claim 1, wherein the clutch comprises a connecting portion, a moving portion, and a driving portion, the connecting portion is rotatably mounted to the driver, and the moving portion and the driving portion are respectively connected to the connecting portion or integrally formed with the connecting portion.

3. The walk-behind self-propelled machine of claim 2, wherein the motor has a motor shaft, the moving portion has a disconnected position and a driving position with respect to the follower, the driving portion drives the moving portion to switch between the disconnected position and the driving position, the motor shaft drives the at least one of the plurality of wheels to rotate when the moving portion is in the driving position, and the at least one of the plurality of wheels rotates freely with respect to the motor shaft when the moving portion is in the disconnected position.

4. The walk-behind self-propelled machine of claim 3, wherein the walk-behind self-propelled machine further comprises a housing for accommodating the driver and the follower and, when the clutch is rotatably mounted to the driver, the connecting portion is mounted to the driver, the driving portion is in contact with a surface of the housing and generates a positive pressure perpendicular to the surface, and the moving portion is enabled to contact or detach from the follower.

5. The walk-behind self-propelled machine of claim 4, wherein the driving portion has a convex surface protruding outward and the convex surface forms a pressing contact with the surface.

6. The walk-behind self-propelled machine of claim 4, wherein the driver is a gear, the follower is a ratchet wheel, and the driving portion and the moving portion are respectively arranged on both sides of the driver along a thickness direction of the driver.

7. The walk-behind self-propelled machine of claim 2, wherein the driver is provided with a stopper for limiting a movement range of the moving portion.

8. The walk-behind self-propelled machine of claim 3, wherein a moving portion moves from a disconnected position to a driving position with respect to the driver when the motor rotates in a first direction and the moving portion moves from the driving position to the disconnected position with respect to the driver when the motor rotates in a second direction.

9. The walk-behind self-propelled machine of claim 3, wherein the walk-behind self-propelled machine further comprises a magnetic member for forming a magnetic contact with the driving portion.

10. The walk-behind self-propelled machine of claim 1, wherein the clutch is switched from the second position to the first position when the motor rotates in a first direction and the clutch is switched from the first position to the second position when the motor rotates in a second direction opposite to the first direction.

11. The walk-behind self-propelled machine of claim 1, wherein the walk-behind self-propelled machine further comprises a control device for controlling an operation of the motor, the control device comprises an operating switch operable by a user, connected or communicatively connected with the motor, and a start module configured to send a first signal and a second signal, the first signal controls the motor to rotate in a first direction, and the second signal controls the motor to stop rotating.

12. The walk-behind self-propelled machine of claim 11, wherein the control device further comprises a control module communicationally or electrically connected with the operating switch, the control module controls the motor to rotate in a second direction for a predetermined time period when the start module sends the second signal, and the predetermined time period ranges from 2 seconds to 20 seconds.

13. The walk-behind self-propelled machine of claim 11, wherein the control device further comprises a control module communicationally or electrically connected with the operating switch and the control module controls the motor to rotate in a second direction for a predetermined time period when the start module sends the second signal.

14. The walk-behind self-propelled machine of claim 1, wherein the clutch comprises a connecting portion and a driving portion, the connecting portion is configured to connect the clutch to the driver, the driving portion is configured to drive the follower, and the clutch moves relative to the driver to the first position or the second position under a resultant force of a tensile force of the connecting portion and a friction force when the motor rotates.

15. A walk-behind self-propelled machine, comprising:
a body;
a plurality of wheels for supporting the body;
a handle connected to the body;
a motor for driving the plurality of wheels to rotate;
a driver coupled to the motor and driven by the motor;
a follower coupled to the plurality of wheels and enabled to drive the plurality of wheels to rotate; and
a clutch switchable between a first position and a second position by a friction force wherein the clutch allows the driver to transmit power to the follower when the clutch is in the first position, the clutch cuts off a power transmission path between the motor and the plurality of wheels when the clutch is in the second position, the clutch is rotatably mounted to the follower, the clutch is in contact with the driver when the clutch rotates to the first position, and the clutch is disengaged from the driver when the clutch rotates to the second position.

16. The walk-behind self-propelled machine of claim 15, wherein the clutch comprises a connecting portion, a moving portion, and a driving portion, the connecting portion is rotatably mounted to the follower, the moving portion and the driving portion are respectively connected to the connecting portion or integrally formed with the connecting portion, the motor has a motor shaft, the moving portion has a disconnected position and a driving position with respect to the follower, the driving portion drives the moving portion to switch between the disconnected position and the driving position, the motor shaft drives the plurality of wheels to rotate when the moving portion is in the driving position, and the plurality of wheels rotate freely with respect to the motor shaft when the moving portion is in the disconnected position.

17. The walk-behind self-propelled machine of claim 16, wherein the driver is a ratchet wheel, the follower is a gear, and the driving portion and the moving portion are arranged on a same side of the follower along a thickness direction of the follower.

18. The walk-behind self-propelled machine of claim 15, wherein when the motor rotates in a first direction, the clutch is switched from the second position to the first position, and the clutch is switched from the first position to the second position when the motor rotates in a second direction opposite to the first direction.

19. The walk-behind self-propelled machine of claim 15, wherein the walk-behind self-propelled machine further comprises a control device for controlling an operation of the motor, the control device comprises an operating switch operable by a user, connected or communicatively connected with the motor, and a start module configured to send a first signal and a second signal, the first signal controls the motor to rotate in a first direction, and the second signal controls the motor to stop rotating.

20. The walk-behind self-propelled machine of claim 19, wherein the control device further comprises a control module communicationally or electrically connected with the operating switch, the control module controls the motor to rotate in a second direction for a predetermined time period when the start module sends the second signal, and the predetermined time period ranges from 2 seconds to 20 seconds.

21. A lawn mower, comprising:
a body;
a plurality of wheels for supporting the body;
a handle connected to the body;
a motor for driving the plurality of wheels to rotate;
a driver coupled to the motor and driven by the motor;
a follower coupled to the plurality of wheels and enabled to drive the plurality of wheels to rotate; and
a clutch switchable between a first position and a second position wherein the clutch allows the driver to transmit power to the follower when the clutch is in the first position, the clutch cuts off a power transmission path between the motor and the plurality of wheels when the clutch is in the second position, the clutch is rotatably mounted to the follower, the clutch is in contact with the driver when the clutch rotates to the first position, and the clutch is disengaged from the driver when the clutch rotates to the second position,
wherein the clutch comprises a connecting portion, a moving portion, and a driving portion, the connecting portion is rotatably mounted to the follower, the moving portion and the driving portion are respectively connected to the connecting portion or integrally formed with the connecting portion, the motor has a motor shaft, the moving portion has a disconnected position and a driving position with respect to the follower, the driving portion drives the moving portion to switch between the disconnected position and the driving position, the motor shaft drives the plurality of wheels to rotate when the moving portion is in the driving position, and the plurality of wheels rotate freely with respect to the motor shaft when the moving portion is in the disconnected position, and wherein the driver is a ratchet wheel, the follower is a gear, and the driving portion and the moving portion are arranged on a same side of the follower along a thickness direction of the follower.

* * * * *